(12) United States Patent
Homma

(10) Patent No.: US 9,908,449 B2
(45) Date of Patent: Mar. 6, 2018

(54) CUP HOLDER

(71) Applicant: NIFCO INC., Yokosuka-shi, Kanagawa (JP)

(72) Inventor: Yoshitsugu Homma, Yokosuka (JP)

(73) Assignee: NIFCO INC., Yokosuka-shi, Kanagawa (JP)

(*) Notice: Subject to any disclaimer, the term of this patent is extended or adjusted under 35 U.S.C. 154(b) by 0 days.

(21) Appl. No.: 14/911,199

(22) PCT Filed: Aug. 7, 2014

(86) PCT No.: PCT/JP2014/004116
§ 371 (c)(1),
(2) Date: Feb. 9, 2016

(87) PCT Pub. No.: WO2015/025494
PCT Pub. Date: Feb. 26, 2015

(65) Prior Publication Data
US 2016/0193948 A1    Jul. 7, 2016

(30) Foreign Application Priority Data

Aug. 19, 2013   (JP) ................................. 2013-169868

(51) Int. Cl.
*B65D 25/00*    (2006.01)
*B60N 3/10*     (2006.01)

(52) U.S. Cl.
CPC ............... *B60N 3/10* (2013.01); *B60N 3/106* (2013.01)

(58) Field of Classification Search
CPC .......... B60N 3/102; B60N 3/10; B60N 3/105; Y10S 224/926

(Continued)

(56) References Cited

U.S. PATENT DOCUMENTS 6,409,136 B1 *  6/2002  Weiss ..................... B60N 3/102
                                                        224/926
6,682,116 B1    1/2004  Okumura
(Continued)

FOREIGN PATENT DOCUMENTS

CN      103112380 A    5/2013
JP      H04-5137 U     1/1992
(Continued)

OTHER PUBLICATIONS

PCT, "International Search Report for International Application No. PCT/JP2014/004116".

(Continued)

*Primary Examiner* — Shawn M Braden
(74) *Attorney, Agent, or Firm* — Manabu Kanesaka

(57) ABSTRACT

A cup holder for holding a beverage container includes a case having a first floor member in a receiving chamber, and a sidewall; a second floor member with a base end side rotatably supported by the sidewall inside the case, and a free end rotatable between a first position where the free end is positioned on a lateral side of a rotary shaft, and a second position where the free end is positioned below the rotary shaft; and an urging device urging the second floor member toward the first position. The second floor member rotates toward the second position when the second floor member receives a load larger than a predetermined load from above at the first position, and holds the beverage container together with the first floor member at a third position where the second floor member is rotated to a second position side more than the first position.

8 Claims, 7 Drawing Sheets

(58) Field of Classification Search
USPC .......................................................... 220/737
See application file for complete search history.

(56) References Cited

U.S. PATENT DOCUMENTS

| | | | | |
|---|---|---|---|---|
| 7,520,405 | B2* | 4/2009 | Ishida | B60N 3/106 |
| | | | | 220/737 |
| 7,757,888 | B2* | 7/2010 | Ogura | B60N 3/102 |
| | | | | 220/345.1 |
| 2009/0095764 | A1* | 4/2009 | Schaal | B60N 3/101 |
| | | | | 220/737 |
| 2016/0000248 | A1 | 1/2016 | Shen | |

FOREIGN PATENT DOCUMENTS

| | | |
|---|---|---|
| JP | 2002-144941 A | 5/2002 |
| JP | 2002-193019 A | 7/2002 |
| JP | 2005-059833 A | 3/2005 |
| JP | 2006-044516 A | 2/2006 |
| JP | 3991045 B2 | 10/2007 |
| JP | 2010-000823 A | 1/2010 |
| KR | 20090052044 A | 5/2009 |

OTHER PUBLICATIONS

China Patent Office, "Office Action for Chinese Patent Application No. 201480045861.X," dated Dec. 5, 2016.

* cited by examiner

CUP HOLDER

RELATED APPLICATIONS

The present application is National Phase of International Application No. PCT/JP2014/004116 filed Aug. 7, 2014, and claims priority from Japanese Application No. 2013-169868, filed Aug. 19, 2013, the disclosure of which is hereby incorporated by reference herein in its entirety.

FIELD OF TECHNOLOGY

The present invention relates to a cup holder, especially, a cup holder for an automobile, which can easily change a depth.

BACKGROUND ART

There is a case wherein a cup holder for housing and holding a beverage container is provided in a console box of an automobile. Generally, the cup holder comprises a concave portion having a bottomed cylindrical shape, and houses the beverage container (cup) in the concave portion thereof. However, recently, beverages are filled in beverage containers sold in various shapes and sizes. Consequently, if a tall beverage container is housed in a shallow cup holder, there is a possibility that at the time of shifting operation, the beverage container may be hit with a driver's elbow. On the other hand, if a short beverage container is housed in a deep cup holder, the beverage container is difficult to be taken out.

From these viewpoints, there is proposed a cup holder wherein a bottom depth is changeable according to the size of the beverage container (for example, Patent Document 1). The cup holder (accessory case) described in the Patent Document 1 comprises a case, and a tray rotating inside the case. When the tray is horizontally-aligned, an upper face of the tray becomes a bottom face of the cup holder so as to have a shallow bottom, and when the tray is rotated upwardly, the bottom face of the case becomes exposed to become the bottom face of the cup holder so as to have a deep bottom. The tray is urged to rotate upwardly, and in a horizontal position, the tray is releasably locked. This lock is released by a pushing operation of a push button.

PRIOR ART DOCUMENT

Patent Document

Patent Document 1: Japanese Unexamined Patent Application Publication No. 2006-44516

SUMMARY OF THE INVENTION

Problems to be Solved by the Invention

In the cup holder described in the Patent Document 1, in order to respond to a difference in a width of the beverage container, another device different from the tray is necessary, and there is a problem that the number of parts has to be increased. Also, although deepening the depth of the cup holder by raising the tray can be carried out only by pushing the push button, in order to make the depth of the cup holder shallow by making the tray horizontal, a user is required to push the tray down by one's hand so as to be bothersome.

The present invention is made in view of the aforementioned problems, and an object of the present invention is to provide a cup holder which can integrally change the depth of the cup holder and adjust the width of the cup holder, and easily carry out an operation for changing the depth of the cup holder.

Means for Solving the Problems

In order to obtain the aforementioned object, a cup holder according to the present invention is a cup holder (1) for holding a beverage container, and comprises a case (2) forming an opening portion (13) on an upper face, defining a receiving chamber (18) for the beverage container, and including a first floor member (11) extending on a lower end of the receiving chamber, and a sidewall (12); a second floor member (3, 4) with a base end side rotatably supported by the sidewall inside the case, and rotatable between a first position where a free end thereof is positioned on a lateral side of a rotary shaft, and a second position where the free end is positioned below the rotary shaft; and an urging device (8) urging the second floor members toward the first position. The second floor member rotates toward the second position when the second floor member receives a load larger than a predetermined load from above at the first position, and can hold the beverage container together with the first floor member at a third position where the second floor member is rotated to a second position side more than the first position.

According to the structure, the beverage container is pressed from above so as to rotate the second floor member from the first position to the third position, so that an operation for housing the beverage container in the cup holder, an operation for deepening a bottom of the receiving chamber, and an operation for expanding a width of a lower portion of the receiving chamber, are carried out at once so as to facilitate an operation. Also, the second floor member supporting a side portion of the beverage container is displaced so as to match beverage containers having various diameters.

In the aforementioned invention, it is preferable that the second floor member is provided with at least one pair, and the respective base end sides of the pair of second floor members are rotatably supported by the sidewall facing each other.

According to the structure, a housing height of the second floor members can be reduced so as to increase a degree of freedom for design in such a way as to reduce a height difference between two bottoms, and the like.

In the aforementioned invention, it is preferable to further comprise an associating device (7) associating the pair of second floor members with each other such that when one of the pair of second floor members rotates from the first position toward the second position, the other of the pair of second floor members rotates from the first position toward the second position.

According to the structure, even if a load for rotating the second floor members concentrates on one of the pair of second floor members, the other of the pair of second floor members rotates while being associated as well, so that even in a case wherein the second floor members are rotated by being pressed by the beverage container, both of the pair of second floor members rotate toward the second positions. Consequently, the beverage container is smoothly inserted into the receiving chamber while rotating the second floor members.

In the aforementioned invention, it is preferable that the urging device includes a torsion coil spring (22) attached to the rotary shaft of the second floor member, and the torsion coil spring provides a pre-load maintaining the second floor member at the first position against a load having the predetermined load or less to the second floor members.

According to the structure, when a load exceeding a predetermined amount is not applied to the second floor members, the second floor members can be maintained at the first position with a small number of parts so as to maintain a shallow bottom state of the receiving chamber.

In the aforementioned invention, it is preferable to further include a fixation device (9) releasably fixing the second floor members at the third position.

According to the structure, a deep bottom state of the receiving chamber can be maintained. Consequently, in a case wherein a tall beverage container is inserted and extracted repeatedly, it becomes unnecessary to rotate the second floor members by applying a force every time when the beverage container is housed.

In the aforementioned invention, it is further preferable that the fixation device releasably fixes the second floor members at a fourth position where the second floor members are rotated to the second position side more than the third position; the fixation device includes an engagement portion attached to the second floor members and a locking member (25) lockable in the engagement portion (41) at the third position and the fourth position; and when the locking member locks the engagement portion at the third position, the fixation device limits the second floor members from rotating to the first position side, but does not limit the second floor members from rotating to the fourth position side.

According to the structure, in the deep bottom state of the receiving chamber, the width of the lower portion of the receiving chamber can be selectively adjusted as to house and hold the beverage container even if the width of the beverage container differs. Also, the width of the receiving chamber is naturally adjusted to an appropriate width by a pressing movement of the beverage container against the second floor members.

In the aforementioned invention, it is preferable that the fixation device further includes an operation button (23) attached to the case, and the locking member is disengaged from the engagement portion by an operation of the operation button.

According to the structure, the deep bottom state of the receiving chamber can be easily changed to the shallow bottom state as well.

In the aforementioned invention, it is preferable that at least one portion of an inner face of the sidewall includes a step portion (16) formed in such a way that an upper portion thereof protrudes to an inside of the case relative to a lower portion thereof, and the base end sides of the second floor members are disposed on a lower side of the step portion, and the second floor members abuts against the step portion at the first position so that an upward rotation is prevented.

According to the structure, without increasing the number of parts, a control device of a rotation of the second floor members at the first position can be provided.

BEST MODES OF CARRYING OUT THE INVENTION

Hereinafter, a cup holder 1 which is one embodiment of the present invention will be explained in detail with reference to drawings. The cup holder 1 according to the present embodiment is attached to a front portion of a console box provided to extend in a front-and-back direction of a vehicle body between the driver's seat and the passenger seat of an automobile. In the following explanation, front-and-back, right-and-left, and up-and-down directions of the cup holder 1 correspond to front-and-back, right-and-left, and up-and-down directions of the automobile.

Figure 1:
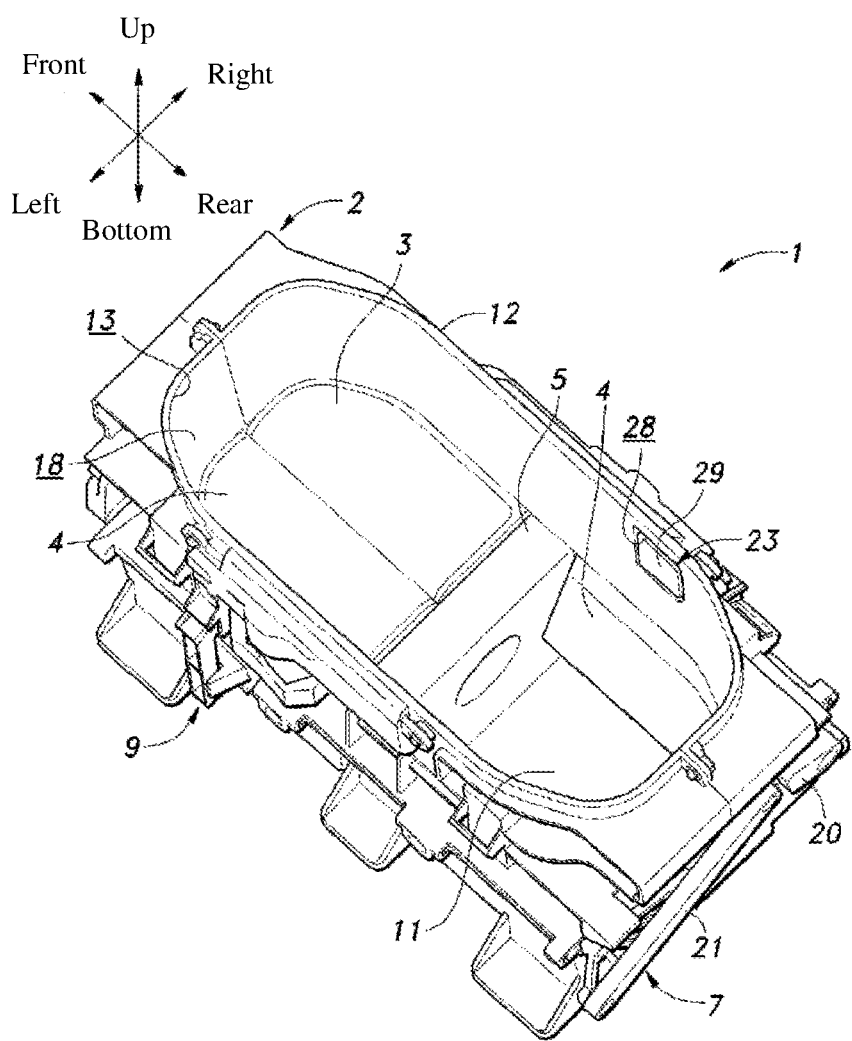
FIG. 1 is an overall perspective view showing a cup holder according to an embodiment of the present invention.
Figure 2:
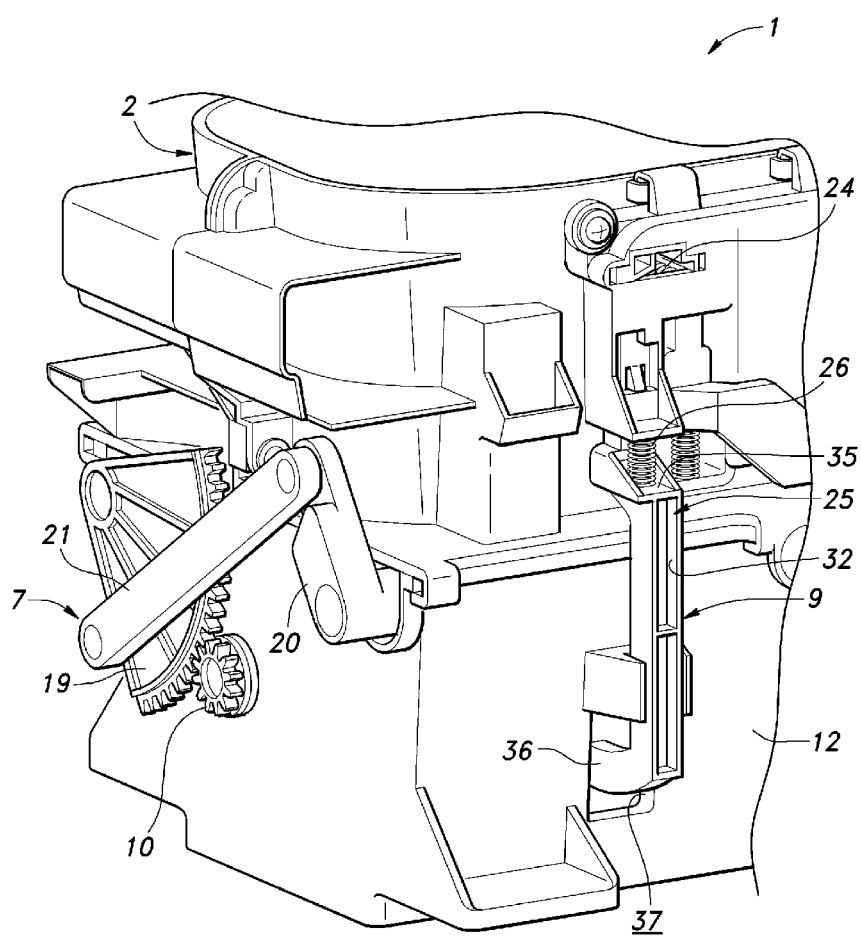
FIG. 2 is a partial enlarged view showing the cup holder according to the embodiment of the present invention.

FIG. 1 is an overall perspective view showing the cup holder 1 according to the embodiment of the present invention. FIG. 2 is a partial enlarged view showing the cup holder 1 viewed from a right rear side according to the present embodiment. With reference to FIG. 1 and FIG. 2, the outline of the cup holder 1 of the present embodiment will be explained.

Referring to FIG. 1, the cup holder 1 has a shape having a symmetric property approximately corresponding to an original shape when it rotates 180 degrees around a central axis in the up-and-down direction. The cup holder 1 comprises a case 2, and a right-and-left pair of second floor members 3 and 4 rotates inside the case 2 so that a bottom depth changes. In the present embodiment, there is attached a partition wall 5 formed by a flat plate having approximately a rectangular shape at the center in the front-and-back direction, and a space of a lower portion inside the case 2 is partitioned into two parts. The partition wall 5 is fitted into a groove formed on an inner face of a sidewall 12 of the case 2 so as to be supported in the case 2. There are provided the right-and-left pair of second floor members 3 and 4 respectively in the partitioned two spaces. In FIG. 1, a front side of the cup holder 1 shows a shallow bottom state, and a back side of the cup holder 1 shows a deep bottom state. The partition wall 5 can be removed by pulling out upwardly.

Referring to FIG. 2, the cup holder 1 further comprises a rotary shaft member 6 rotatably supporting the second floor members 3 and 4; an associating device 7 associating the pair of second floor members 3 and 4 with each other; an urging device 8 for urging the pair of second floor members 3 and 4 to a position (a first position) where the shallow bottom state is established; a fixation device 9 for releasably fixing the pair of second floor members 3 and 4 at a position of being rotated downwardly to maintain the deep bottom state; and a rotary damper 10 reducing a moving speed of the pair of second floor members 3 and 4.

Next, structures of the cup holder 1 will be individually explained.

Referring to FIG. 1, the case 2 includes a first floor member 11 formed by a flat plate having approximately a rectangular shape; and the sidewall 12 provided to extend upwardly from a peripheral edge of the first floor member 11, and an upper face becomes an opening portion 13. Right-and-left inner faces of the upper portion of the sidewall 12 protrude to the inside of the case 2 compared to right-and-left inner faces of the lower portion of the sidewall 12, and the lower face of the upper portion forms a step face 16 (see FIG. 5) opposing the first floor member 11 inside the case 2. Also, in the sidewall 12, there is formed the rotary shaft member 6 (see FIG. 5) rotatably supporting the second floor members 3 and 4 at a proximity position below the step face 16. A difference between the inner face of the upper portion and the inner face of the lower portion approximately corresponds to a thickness of the second floor members 3 and 4, and when the second floor members 3 and 4 are rotated until becoming vertical to the first floor member 11, the inner face of the upper portion and a surface 17 of the second floor members 3 and 4 work together to form a smooth face in the up-and-down direction. The case 2 is formed by an injection molding of, for example, ABS resin, polycarbonate resin, ABS/polycarbonate alloy, and the like. Incidentally, other members using a resin as a raw material are formed in the same manner.

Figure 3:
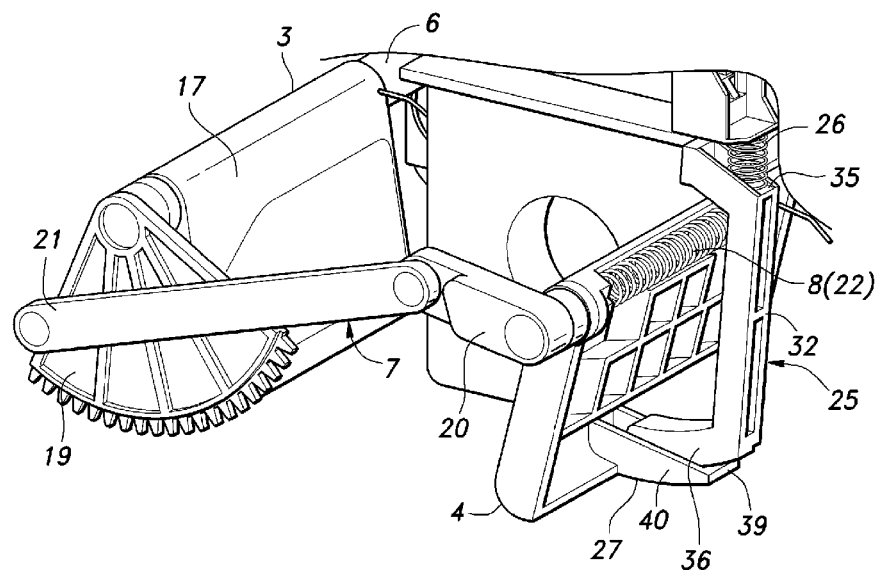
FIG. 3 is a perspective view showing a connecting structure of second floor members of the cup holder according to the embodiment of the present invention.
Figure 4:
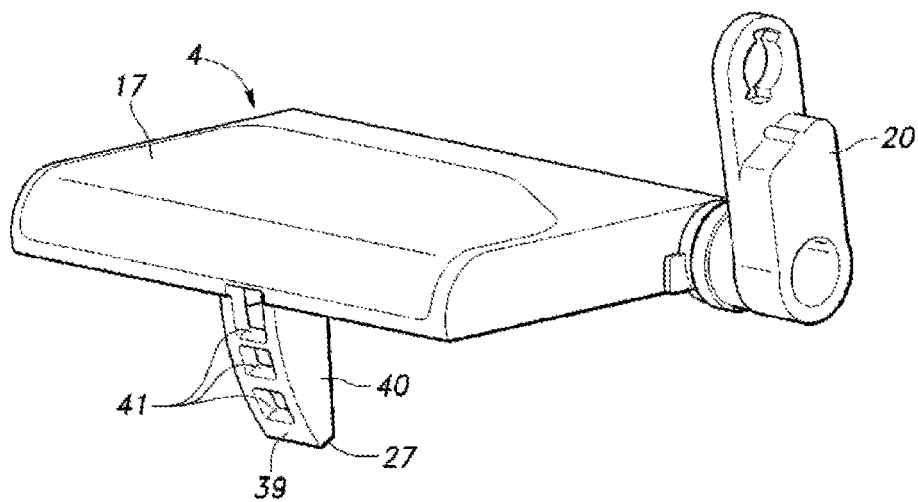
FIG. 4 is a perspective view showing one of a pair of second floor members of the cup holder according to the embodiment of the present invention.

With reference to FIG. 3 and FIG. 4, the pair of second floor members 3 and 4, the associating device 7, and the urging device 8 will be explained. The pair of second floor members 3 and 4, the associating device 7, and the urging device 8 are respectively provided with one pair in front and back of the cup holder 1 (see FIG. 1); however, those structures correspond when they rotate 180 degrees around the central axis in the up-and-down direction, and functions are the same, so that hereinafter, members positioned in the back in FIG. 1 will be explained. FIG. 3 is a partial enlarged view of the cup holder 1 wherein the case 2 is omitted. FIG. 4 is a perspective view of the second floor member 4.

Each of the pair of second floor members 3 and 4 is a flat-plate-like member using a resin as a raw material and having approximately an rectangular shape. Base end sides of the second floor members 3 and 4 are rotatably supported in the rotary shaft members 6 disposed along the step face 16 of the case 2, so that the second floor members 3 and 4 rotate (swing) inside the case 2 in such a way that free ends thereof form an arc, and a rotation range thereof is between a first position where the free ends thereof are positioned on a lateral side of the rotary shafts, and the surfaces 17 of the second floor members 3 and 4 become approximately horizontal; and a second position where the free ends thereof are positioned below the rotary shafts, and the surfaces 17 of the second floor members 3 and 4 become approximately vertical. When the pair of second floor members 3 and 4 is rotated until the first position where the surfaces 17 thereof become horizontal, the respective free ends come close. The surfaces 17, which become the upper face at that time, and the upper face of the partition wall 5 form a smooth flat face to form a shallow bottom of a receiving chamber 18 (see FIG. 1) for a beverage container. Also, the free ends of the second floor members 3 and 4 prevent from being caught on the beverage container so as to have a rounded shape. Rear faces of the second floor members 3 and 4 may have a thinning structure.

On a side face of the base end side of one second floor member 3 (on the left side in FIG. 3) of the pair of second floor members 3 and 4, there is attached a fan-shaped gear 19 using the resin as the raw material in such a way as to be disposed outside the sidewall 12 of the case 2. The gear 19 coaxially and integrally rotates with the second floor member 3, and is engaged with the rotary damper 10 (see FIG. 2) disposed outside the case 2. Consequently, a rotating force of the second floor member 3 is attenuated by the rotary damper 10. For the rotary damper 10, there is used, for example, a viscous-damping-type oil damper. Thereby, a rotation of the second floor member 3 is carried out at a low speed under a damper operation of the rotary damper 10.

The associating device 7 associating the pair of second floor members 3 and 4 is formed by a link bar 20 and a link arm 21.

On a side face of the base end side of the second floor member 4 (on the fight side in FIG. 3), where the gear 19 is not attached, of the pair of second floor members 3 and 4, there is attached a link bar 20 using the resin as the raw material in such a way as to be disposed outside the sidewall 12 of the case 2. One end side of the link bar 20 is attached to the side face of the base end side of the second floor member 4 in such a way as to integrally rotate with the second floor member 4, and when viewed from the back (the left front in FIG. 3), the link bar 20 is fixed at a position where it has rotated only a predetermined angle clockwise (upwardly) relative to the second floor member 4 around the rotary shaft.

The link arm 21 is a rod-like molded article using the resin as the raw material. One end of the link arm 21 is connected to the other end of the link bar 20 rotatably relative to the link bar 20 and the gear 19 respectively, and the other end of the link arm 21 is connected to the gear 19. A position where the other end of the link arm 21 is connected to the gear 19 is a position separated from the rotary shaft of the gear 19 only for a distance nearly equal to a length of the link bar 20, and is a position where when viewed from the back, the link arm 21 is rotated clockwise relative to the second floor member 3 around the rotary shaft only for a predetermined angle. Thus, since the link arm 21 is rotatably connected to the link bar 20 and the gear 19, when one of the pair of second floor members 3 and 4 is rotated, the other of the pair of second floor members 3 and 4 rotates, so that movements of both members become approximately symmetric.

The urging device 8 includes a torsion coil spring 22. The torsion coil spring 22 is attached in such a way as to include the rotary shaft member 6, and one end is engaged in the sidewall 12, and the other end is engaged in the second floor members 3 and 4 to urge the second floor members 3 and 4 in a rotation direction toward the first position from the second position. The step portion 16 of the sidewall 12 functions as a stopper controlling an upward movement of the second floor members 3 and 4. Specifically, the step face 16 locks the base end side of the surface 17 of the second floor members 3 and 4 so as to control the second floor members 3 and 4 from rotating upward more than the first position. Also, when the second floor members 3 and 4 are located at the first position, the torsion coil spring 22 applies a pre-load in such a way as to press the second floor members 3 and 4 against the step face 16. Moments, in a reverse direction and the same size relative to moments generated on the second floor members 3 and 4 by the aforementioned pre-load, can be generated by applying a predetermined load (strength according to a position) from above relative to the second floor members 3 and 4. If the load from outside and above relative to the second floor members 3 and 4 has the predetermined load or below, the second floor members 3 and 4 do not rotate, and are maintained at the first position. It is preferable that the torsion coil spring 22 has a small spring constant and a long length. By reducing the spring constant, a force for pushing down the second floor members 3 and 4 against a spring force can be prevented from rising on a large scale while being pushed down. Also, by increasing the length, displacement of the torsion coil spring 22 can be increased, so that even if the spring constant is small, a large pre-load can be provided to the second floor member 4. In the present embodiment, the length of the torsion coil spring 22 approximately corresponds to a length in the front-and-back direction of the base end side of the second floor members 3 and 4.

Figure 5:
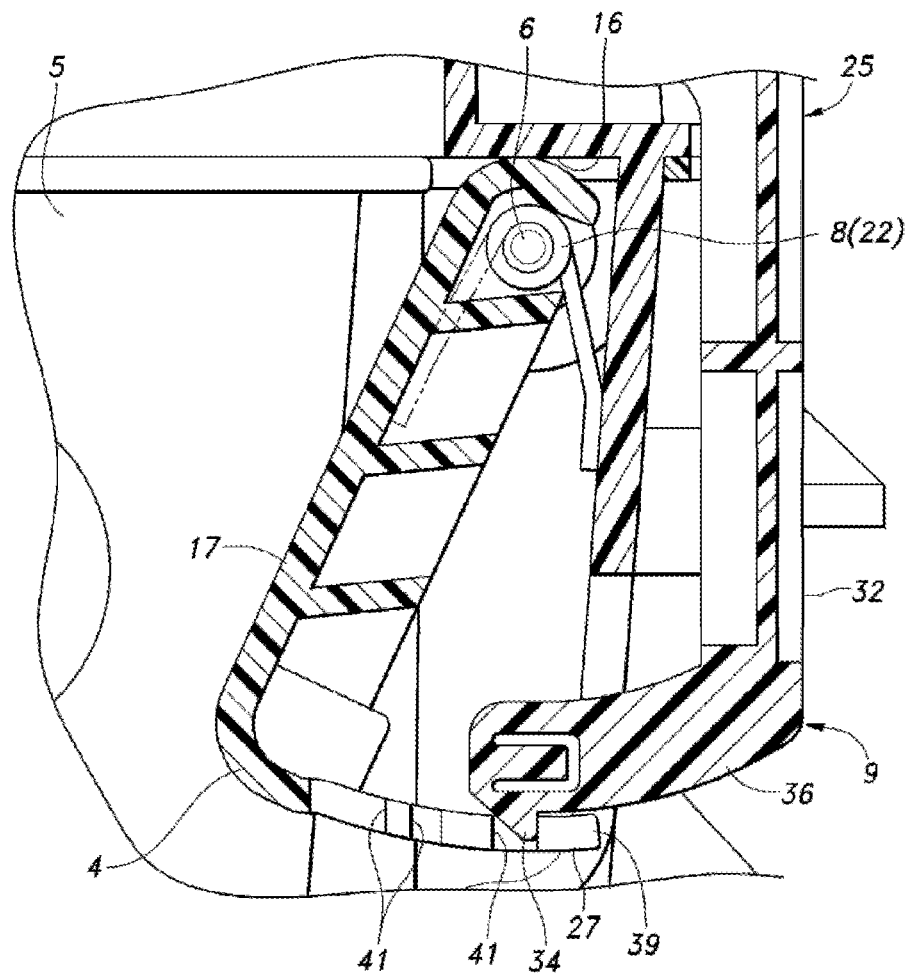
FIG. 5 is a cross-sectional view showing an engagement state of the second floor members of the cup holder according to the embodiment of the present invention.
Figure 6:
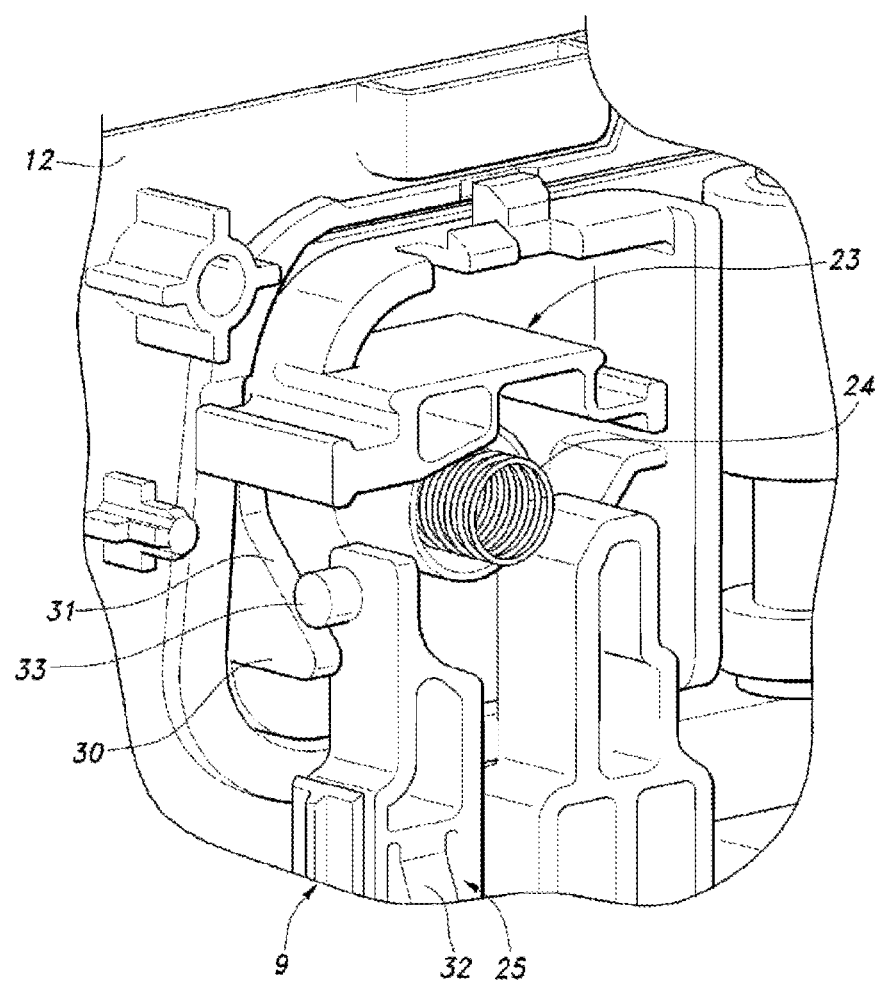
FIG. 6 is a partial enlarged view showing a relationship between a locking member and an operation button when the second floor members of the cup holder are in the engagement state according to the embodiment of the present invention.
Figure 7:
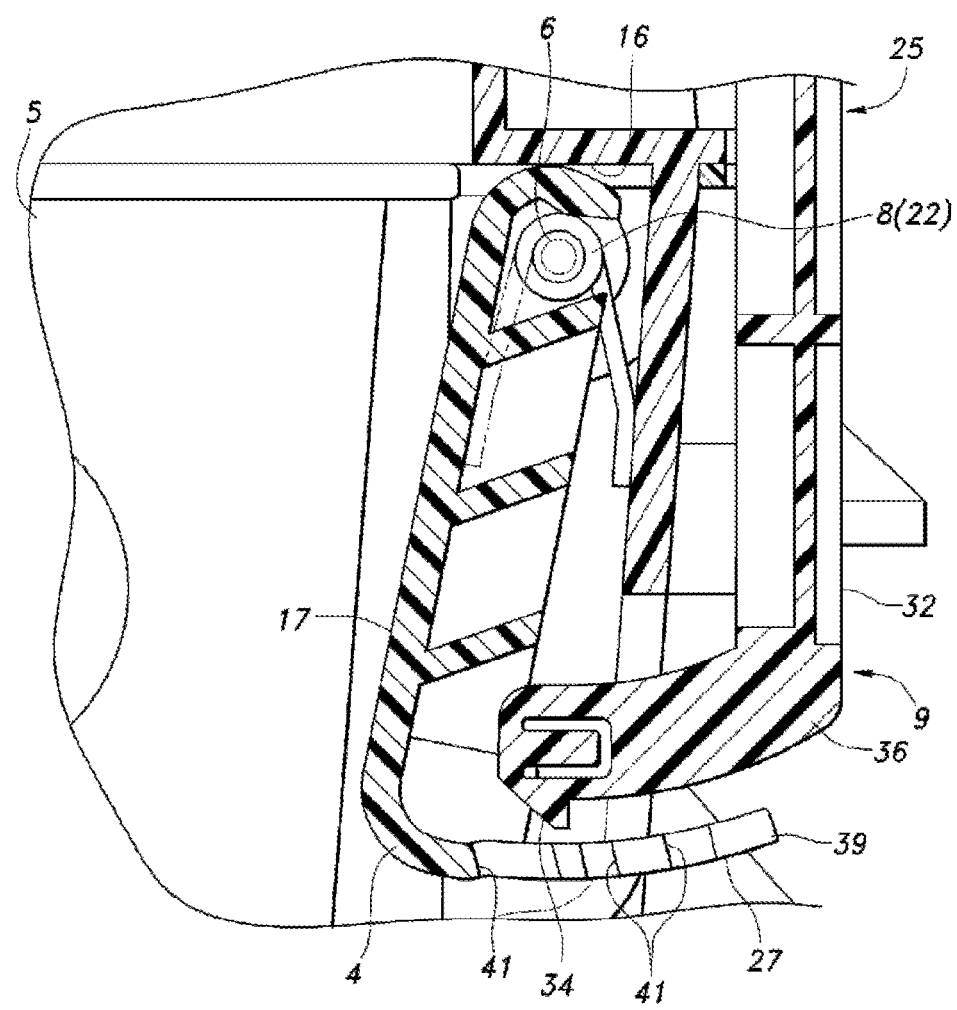
FIG. 7 is a cross-sectional view showing a state wherein an engagement of the second floor members of the cup holder is released according to the embodiment of the present invention.
Figure 8:
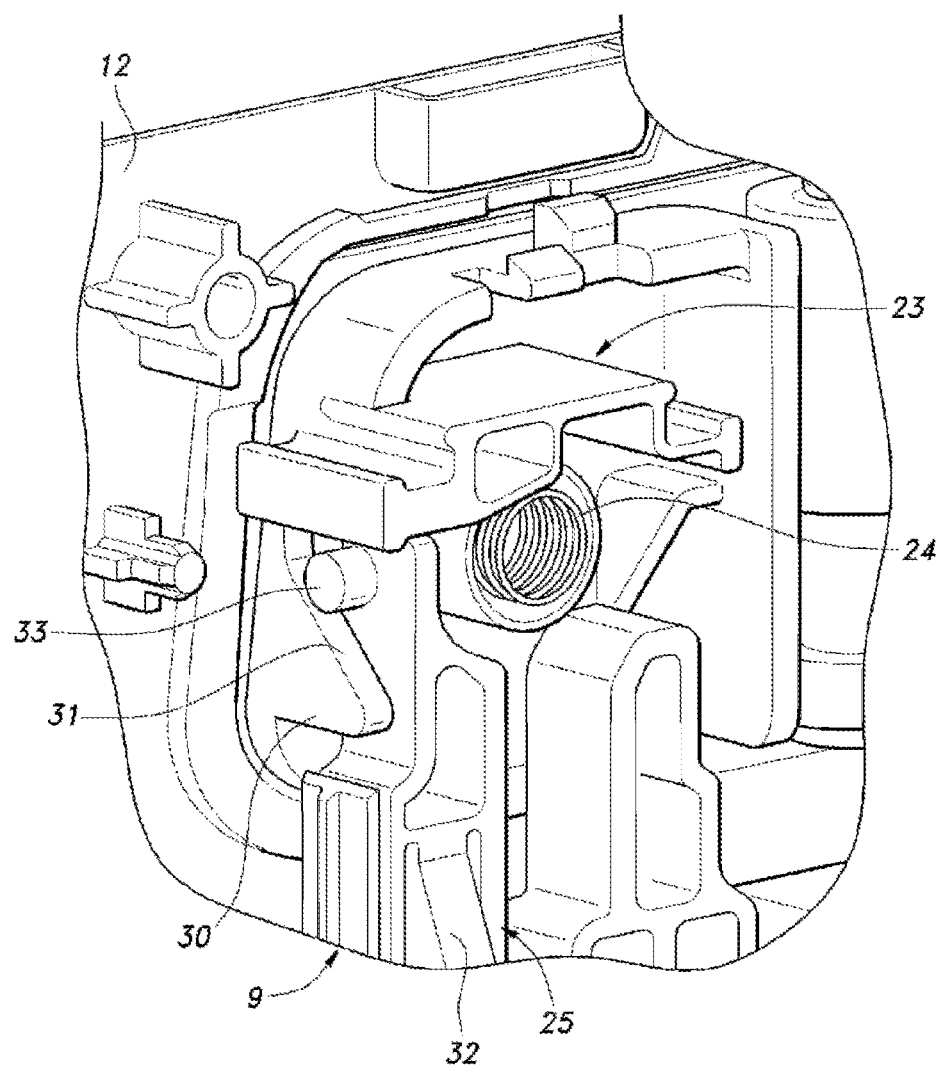
FIG. 8 is a partial enlarged view showing a relationship between the locking member and the operation button when the engagement of the second floor members of the cup holder is released according to the embodiment of the present invention.

Next, with reference to FIG. 5 to FIG. 8, the fixation device 9 will be explained. The fixation device 9 is the device for releasably fixing one second floor member 4 at a predetermined position (a third position to a fifth position) between the first position and the second position, and maintaining the deep bottom state of the receiving chamber 18. When one second floor member 4 is fixed, the other second floor member 3 connected to the second floor member 4 thereof by the associating device 7 is also fixed. The fixation device 9 is formed by an operation button 23, an operation button spring 24, a locking member 25, a locking member spring 26, and an engagement piece 27. FIG. 5 is a cross-sectional view showing an engagement state of the second floor member 4. FIG. 6 is a partial enlarged view showing a relationship between the operation button 23 and the locking member 25 when the second floor member 4 is in the engagement state. FIG. 7 is a cross-sectional view showing a state wherein an engagement of the second floor member 4 is released. FIG. 8 is a partial enlarged view showing a relationship between the operation button 23 and the locking member 25 when the engagement of the second floor member 4 is released.

The operation button 23 is made of a resin, and is disposed on the upper portion of the sidewall 12 where the second floor member 4 is disposed. On the upper portion of the sidewall 12 wherein the operation button 23 is disposed, there is provided a concave portion 28, and the operation button 23 is housed in the concave portion 28, and is slidable in a direction orthogonal to the sidewall 12 around the concave portion 28. Both ends of a slidable range of the operation button 23 are positions where one portion of the operation button 23 abuts against one portion of the concave portion 28 to control a further movement thereof, respectively. A movement to an inner face side of the case 2 of the operation button 23 is controlled at a position where a button surface 29 of the operation button 23 and the inner face of the sidewall 12 around the concave portion 28 form the same flat face. On the rear face of the operation button 23, there is formed a cam 30 having a triangular prism shape. The cam 30 is disposed such that a bottom face of a triangle thereof is orthogonal to the inner face of the sidewall 12 around a horizontal face and the concave portion 28. One of three side faces is connected to a rear face of a main body of the operation button 23, and an upper side face 31 of the rest of side faces inclines toward the outside of the case 2 as moving downward.

The operation button spring 24 is made of a compression coil spring, and is attached to the concave portion 28 to urge the operation button 23 in an inward direction of the case 2.

The locking member 25 using the resin as the raw material is disposed outside the sidewall 12 of the case 2, and movements in the front-and-back and right-and-left directions are controlled; however, the locking member 25 is the member moving up and down within a predetermined range according to an operation of the operation button 23. The locking member 25 includes a locking member main body 32 extending approximately up and down; a sliding protrusion 33 on an upper end side; and a locking protrusion 34 on a lower end side. The locking member main body 32 includes a shoulder portion 35 including an approximately horizontal upper face between an upper portion of a rod shape extending up and down and a lower portion of the rod shape extending up and down. In the shoulder portion 35, there is attached a lower end of the later-described locking member spring 26. Also, on a lower end portion of the locking member main body 32, there is formed a locking portion 36 extending toward the left side (the inward direction of the case 2) from the lower portion. The lower face of the locking portion 36 forms an arc around the rotary shaft of the second floor member 4 viewed from a rear face. A tip of the locking portion 36 is inserted to the inside of the case 2 from a through hole 37 provided on the lower portion of the sidewall 12. On the lower face on a tip side of the locking portion 36, there is formed the triangular-prism-shaped locking protrusion 34 having a rectangular triangle viewed from a rear face. One side on the upper side of the rectangular triangle is one portion of the arc of the locking portion 36. One side on the right side extends in a vertical direction, and a lower left hypotenuse is inclined upwardly toward the inside (the left side) of the case 2. Namely, the locking protrusion 34 includes a locking face on the right side, and has an inclined face on the left side.

On the upper end side of the locking member main body 32, there is connected the sliding protrusion 33 protruding backward, i.e., horizontally and in a direction parallel to the inner face of the sidewall 12, and the sliding protrusion 33 slides on the upper side face 31 of the cam 30. When the operation button 23 is pushed in, the cam 30 moves toward the outside of the case 2, so that the sliding protrusion 33 rises in such a way as to slide toward an upper left from a lower right on the upper side face 31 of the cam 30.

The locking member spring 26 is made of a compression coil spring, and an upper end thereof is fixed to the outside of the sidewall 12 of the case 2, and a lower end thereof is fixed to the upper face of the shoulder portion 35 to urge the locking member 25 downwardly.

The engagement piece 27 is a molded article using the resin as the raw material, and includes a main plate 39, and ribs 40 extending from front and back edges of the main plate 39 (see FIG. 3). One end of the main plate 39 is attached to a rear face on a free end side of the second floor member 4, and the other end is a free end, and forms an arc shape around the rotary shaft of the second floor member 4 viewed from a rear face. The free end of the main plate 39 protrudes and retracts outside the case 2 from the through hole 37 of the sidewall 12 of the case 2 accompanied with a rotation of the second floor member 4. When the second floor member 4 is located at the second position, the main plate 39 is positioned proximately below the locking portion 36 on the lower end side of the locking member 25. In the main plate 39, there are formed three engagement portions 41 side by side in a direction of forming the arc, and the engagement portions 41 are formed by holes penetrating orthogonal to the main face thereof. When the locking protrusion 34 is engaged with one of the engagement portions 41, the locking face on the right side of the locking protrusion 34 locks a right inner face of the through hole of the engagement portion 41 to control the rotation of the second floor member 4 to a first positional direction against an urging force of the torsion coil spring 22. On the other hand, the rotation into a second positional direction is not controlled since the inclined face on the left side of the locking protrusion 34 slides a left upper edge of the through hole of the engagement portion 41 to raise the locking member 25 so as to release the engagement. When the respective engagement portions 41 are connected to the locking protrusion 34, the pair of second floor members 3 and 4 is fixed. When positions, wherein the respective engagement portions 41 on the free end side, the center, and the base end side are engaged with the locking protrusion 34, are the third position, the fourth position, and the fifth position, the third to fifth positions are located between the first position and the second position, and the fourth position becomes closer to the second position more than the third position, and the fifth position becomes closer to the second position more than the fourth position, and a distance between the free ends of the pair of second floor members 3 and 4 extends. Also, when the operation button 23 is pushed in, the locking member 25 rises so as to release the engagement between the locking protrusion 34 and the engagement portion 41.

Next, a use method of the present embodiment will be explained.

When the front-and-back two sets of second floor members 3 and 4 are all located at the first position, the surface 17 of the two sets of second floor members 3 and 4, and the upper face of the partition wall 5 work together to form approximately a flat horizontal face. Thereby, the cup holder 1 can house two to three short beverage containers. Also, at that time, the cup holder 1 can be used as an accessory case housing small articles other than the beverage containers.

For example, when a tall beverage container such as a plastic bottle which can house a beverage of approximately 500 ml is desired to be housed and held in the cup holder 1, a force is applied to the plastic bottle in such a way as to press the bottom of the plastic bottle against the pair of second floor members 3 and 4. Then, when the force is applied to the pair of second floor members 3 and 4 in a direction opposite to the urging force of the torsion coil spring 22, and the moments generated by the force applied to the second floor members 3 and 4 from the plastic bottle becomes larger than the moment by the urging force of the torsion coil spring 22, each of the second floor members 3 and 4 rotates toward the second position in such a way that the pair of second floor members 3 and 4 opens. Even if the force from the plastic bottle concentrates to one of the pair of second floor members 3 and 4, since the pair of second floor members 3 and 4 is associated by the associating device 7, the pair of second floor members 3 and 4 rotates approximately in a right-left symmetric manner. Consequently, the container can be inserted smoothly. Then, when the plastic bottle is directly pushed into the pair of second floor members 3 and 4, the bottom of the plastic bottle abuts against the first floor member 11. At that time, the plastic bottle is supported in the first floor member 11 from below, and is clamped by the second floor members 3 and 4 from right and left. In a case of traveling on a road surface where there is a possibility that a vehicle vibrates on a large scale, the plastic bottle may be held at that position.

Also, from this state, when the plastic bottle is moved slightly to right and left, the locking member 25 and the engagement portion 41 are engaged at any of the third to fifth positions, and the pair of second floor members 3 and 4 is fixed in a state wherein the distance between the free ends of the pair of second floor members 3 and 4 is slightly wider than a width of the right-and-left direction of the plastic bottle. Since there are three engagement portions 41, the beverage containers having different widths can be housed and held. At that time, the plastic bottle is supported by the first floor member 11 from below, and a movement in the right-and-left direction is controlled within a predetermined range by the pair of second floor members 3 and 4, and a movement in the front-and-back direction is controlled within a predetermined range by the partition wall 5 and the sidewall 12. This state is suitable for a case wherein a vehicle oscillation is small, and allows a plastic bottle whose trunk portion has a constricted shape relative to the bottom to be easily taken out. Thus, the cup holder 1 can deepen the bottom, and a width in the right-and-left direction can be simultaneously adjusted as well. The cup holder 1 can adjust the bottom depth according to a height of the beverage container at a position at which a driver's elbow and the like do not hit the beverage container at a driving operation time, and the beverage container can be easily taken out. In the cup holder 1, one tall beverage container and one short beverage container may be held by rotating only one of the front-and-back two sets of second floor members 3 and 4 toward the second position, and two tall beverage containers may be held by rotating both of the front-and-back two sets of second floor members 3 and 4. Also, in the cup holder 1, when both of the two sets of second floor members 3 and 4 are fixed in the third to fifth positions, and the partition wall 5 is removed, the cup holder 1 can be used as a deep accessory case.

Also, the second floor members 3 and 4 can rotate up to the first position to return to a shallow bottom state of the receiving chamber 18 by a simple operation of pushing the operation button 23 in.

A specific embodiment has been explained above; however, the present invention is not limited to the aforementioned embodiment, and can be widely modified. The number of the engagement portions 41, i.e., the number of a releasable fixation position of the pair of second floor members 3 and 4 is not limited to three, and may be one, two, or four or more. Also, an engagement between the engagement piece 27 and the locking member 25 may be a concave and convex, or a ratchet. Also, in the present embodiment, the first floor member 11 is a bottom wall of the case 2; however, the first floor member 11 may be a member different from the bottom wall. Also, there may be provided a partition plate which can protrude and retract inside the case 2 from the upper portion of the sidewall 12. If one or two partition plates are provided, in the shallow bottom state, the beverage container can be controlled from moving into the front-and-back direction. For example, the partition plate may be rotatably supported in the rotary shaft provided inside the sidewall 12 and extending in the vertical direction, and may rotate between a position retracted inside the sidewall 12, and a position protruded at an angle of 90 degrees relative to the sidewall 12 to rotate up to a protruding position by pushing the operation button 23 in.

EXPLANATION OF SYMBOLS

1 . . . a cup holder, 2 . . . a case, 3 and 4 . . . second floor members, 7 . . . an associating device, 8 . . . an urging device, 9 ... a fixation device, 11 ... a first floor member, 12 ... a sidewall, 16 ... a step face, 18 ... a receiving chamber, 19 ... a gear, 20 ... a link bar, 21 ... a link arm, 22 ... a torsion coil spring, 23 ... an operation button, 25 ... a locking member, 27 ... an engagement piece, 30 ... a cam, 33 ... a sliding protrusion, 34 ... a locking protrusion, 36 ... a locking portion, 41 ... an engagement portion

What is claimed is:

1. A cup holder for holding a beverage container, comprising:
a case forming an opening portion on an upper face, defining a receiving chamber for the beverage container, and including a first floor member extending on a lower end of the receiving chamber, and a sidewall;
a second floor member arranged between the opening portion and the first floor member, and including at least one pair of floor members having base ends rotatably supported to sides of the sidewall facing each other inside the case, and free ends, each free end rotatable between a first position where the free end is positioned on a lateral side of a rotary shaft of each of the at least one pair of floor members, and a second position where the free end is positioned below the rotary shaft;
an urging device urging the second floor member toward the first position; and
an associating device associating the at least one pair of floor members with each other such that when one of the at least one pair of floor members rotates from the first position toward the second position, the other of the at least one pair of floor members rotates from the first position toward the second position,
wherein the second floor member rotates toward the second position when the second floor member receives a load larger than a predetermined load from above at the first position, and holds the beverage container together with the first floor member at a third position where the second floor member is positioned between the second position and the first position.

2. A cup holder according to claim 1, wherein the urging device includes a torsion coil spring attached to the rotary shaft of the second floor member, and the torsion coil spring provides a pre-load maintaining the second floor member at the first position against a load having the predetermined load or less to the second floor member.

3. A cup holder according to claim 1, further comprising a fixation device releasably fixing the second floor member at the third position.

4. A cup holder according to claim 1, wherein the case includes the first floor member on a bottom portion thereof and the sidewall surrounding the first floor member to form the receiving chamber thereinside for storing the beverage container, and
the second floor member has a flat surface portion for supporting a bottom surface of the beverage container at the first position, and rotates between the first position and the second position above the first floor member to change a depth of the receiving chamber.

5. A cup holder according to claim 4, wherein the sidewall includes a lower portion extending upwardly from the first floor member, a step portion protruding inwardly from an upper end of the lower portion, and an upper portion extending upwardly from an inner end of the step portion, and
the second floor member is positioned under the step portion at the second position such that the flat surface portion of the second floor member is positioned same as an inner face of the upper portion in an up-and-down direction.

6. A cup holder for holding a beverage container, comprising:
a case forming an opening portion on an upper face, defining a receiving chamber for the beverage container, and including a first floor member extending on a lower end of the receiving chamber, and a sidewall;
a second floor member with a base end rotatably supported to the sidewall inside the case, and a free end rotatable between a first position where the free end is positioned on a lateral side of a rotary shaft of the second floor member, and a second position where the free end is positioned below the rotary shaft;
an urging device urging the second floor member toward the first position; and
a fixation device releasably fixing the second floor member at a third position where the second floor member is positioned between the second position and the first position,
wherein the second floor member rotates toward the second position when the second floor member receives a load larger than a predetermined load from above at the first position, and holds the beverage container together with the first floor member at the third position,
the fixation device further releasably fixes the second floor member at a fourth position where the second floor member is positioned between the second position and the third position, and
the fixation device includes an engagement portion attached to the second floor member, and a locking member lockable in the engagement portion at the third position and the fourth position, and when the locking member locks the engagement portion at the third position, the fixation device prevents the second floor member from rotating to the first position, but permits the second floor member to rotate to the fourth position.

7. A cup holder according to claim 6, wherein the fixation device further includes an operation button attached to the case, and the locking member is disengaged from the engagement portion by an operation of the operation button.

8. A cup holder for holding a beverage container, comprising:
a case forming an opening portion on an upper face, defining a receiving chamber for the beverage container, and including a first floor member extending on a lower end of the receiving chamber, and a sidewall;
a second floor member arranged between the opening portion and the first floor member, and having a base end rotatably supported to the sidewall inside the case, and a free end rotatable between a first position where the free end is positioned on a lateral side of a rotary shaft of the second floor member, and a second position where the free end is positioned below the rotary shaft; and
an urging device urging the second floor member toward the first position,
wherein the second floor member rotates toward the second position when the second floor member receives a load larger than a predetermined load from above at the first position, and holds the beverage container together with the first floor member at a third position where the second floor member is positioned between the second position and the first position, the sidewall includes a step portion formed on at least one portion of an inner face thereof such that an upper portion of the sidewall protrudes to an inside of the case relative to a lower portion thereof, the base end of the second floor member is disposed under the step portion, and the second floor member bumps onto the step portion at the first position so that a rotation further rotating upwardly from the first position is restricted.

* * * * *